(12) United States Patent
Hsu

(10) Patent No.: US 9,566,831 B2
(45) Date of Patent: Feb. 14, 2017

(54) PUNCTURE-PROOF STRUCTURE FOR TIRE

(71) Applicant: Shut Chen Hsu, Yilan County (TW)

(72) Inventor: Shut Chen Hsu, Yilan County (TW)

( * ) Notice: Subject to any disclaimer, the term of this patent is extended or adjusted under 35 U.S.C. 154(b) by 374 days.

(21) Appl. No.: 14/294,261

(22) Filed: Jun. 3, 2014

(65) Prior Publication Data
US 2015/0343855 A1 Dec. 3, 2015

(51) Int. Cl.
*B60C 17/04* (2006.01)
*B60C 19/12* (2006.01)

(52) U.S. Cl.
CPC ........... *B60C 17/047* (2013.04); *B60C 17/041* (2013.04)

(58) Field of Classification Search
CPC .................................. B60C 17/04; B60C 19/12
See application file for complete search history.

(56) References Cited

U.S. PATENT DOCUMENTS 6,932,131 B1 * 8/2005 Hsu .......................... B60C 17/04
152/158

* cited by examiner

*Primary Examiner* — Justin Fischer
(74) *Attorney, Agent, or Firm* — Rosenberg, Klein & Lee

(57) ABSTRACT

A puncture-proof structure for tires is provided. The structure forms a spare tire body that can be assembled rapidly and adapted to various tire types by being finely tuned. A tire using the spare tire body is puncture-proof such that when punctured by sharp articles or knifes, the tire can still work to make safe arrival at a nearby repair workshop. This saves a car driver who has a damaged tire from the trouble of shoving the car and from the danger of endangering his/her life, in turn ensuring the public traffic safety.

5 Claims, 10 Drawing Sheets

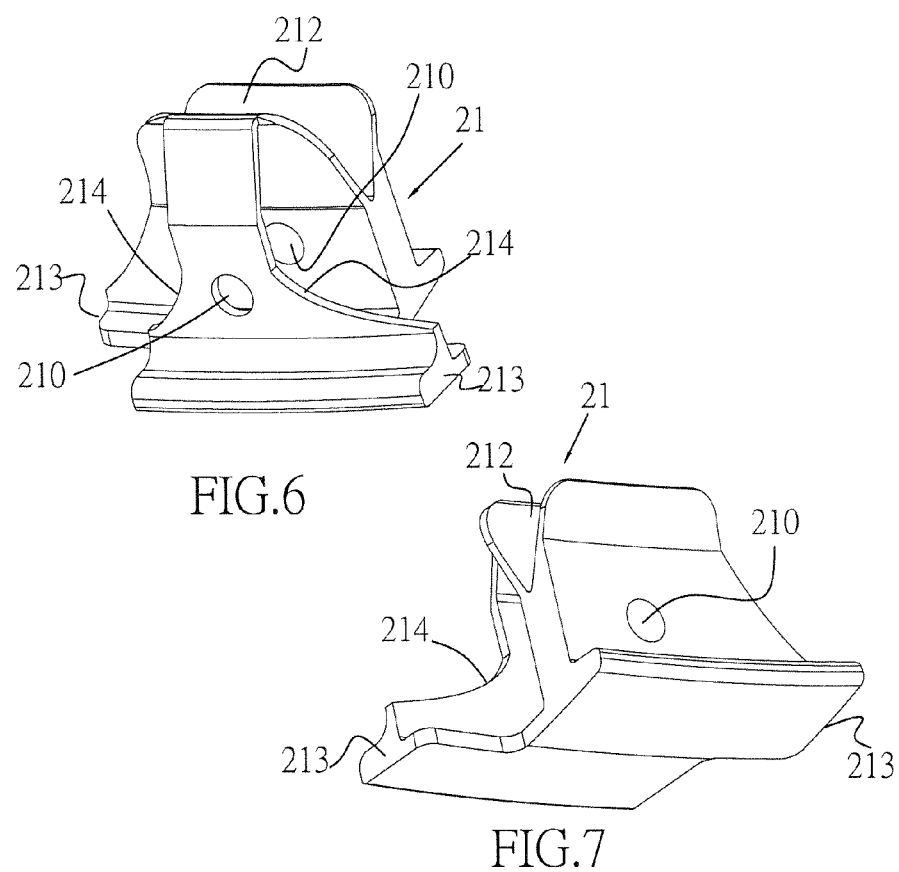
FIG.6
FIG.7
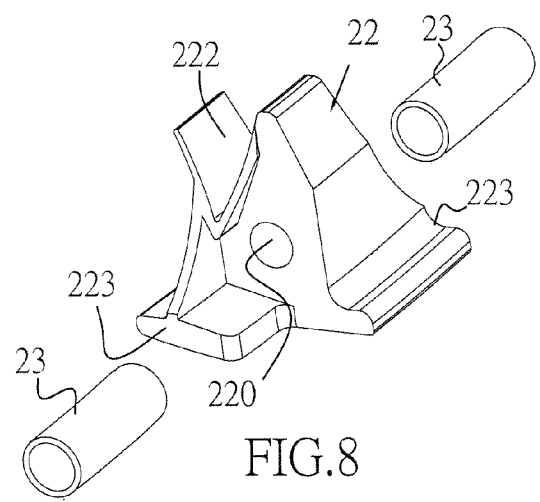
FIG.8

PUNCTURE-PROOF STRUCTURE FOR TIRE

BACKGROUND OF THE INVENTION

1. Technical Field

The present invention relates to a puncture-proof structure for tires, which can be rapidly installed into a tire and is adaptive to various tire types by using fine tuning, thereby ensuring driving safety.

2. Description of Related Art

Generally, tires can be categorized into regular tires that have an inner tube therein and tubeless tires without using an inner tube, both of which are not resistant to damages caused by external force. A tire with an inner tube is ready to work when the inner tube is inflated to expand an outer tube of the tire. Upon puncture by a knife or a sharp article, the tire becomes flat and unusable immediately, bringing the driver with much trouble, such as shoving the car. In the case such a tire gets punctured when the car using it is running fast, traffic accidents are likely to happen. On the other hand, tubeless tires are known to be able to defer the tire's complete flatness upon puncture, so as to provide sufficient buffer time for the driver to drive the car to a nearby repair workshop. While this buffering function does allow a driver with a damaged tubeless tire to safely arrive at a repair workshop, this function can also hinder a car driver from immediately noticing the tire damage as the tire pressure does not drop sharply. In this case, if the car driver is not aware of the tire damage drives his/her car in high speed or on a rugged road, the tire is likely to become unusable immediately and put the driver into the risk of a traffic accident that endangers his/her life.

In view of the shortcomings of the prior-art devices, the present inventor is concerned about the public traffic safety and has invented numerous novel tire improvements, including many that have been patented in many countries. Nevertheless, instead of being complacent about his achievements, the inventor continues to research and improve his patented inventions (as the inventor owns numerous applications and patents, the list is too long to be exhaustively named herein), and herein provides a further improved simplified structure that can be assembled rapidly in order to benefit the public in terms of driving safety.

The configuration, objectives, means and spirit of the present invention will be explained in detail in the following paragraphs and the accompanying drawing.

BRIEF SUMMARY OF THE INVENTION

The present invention is directed to a puncture-proof structure for tires. Particularly, the puncture-proof structure provides a spare tire body that can be installed to a tire rapidly and is applicable to various tire types by using fine tuning. The spare tire body makes a tire using the same puncture-proof. The tire has its two top inner edges formed with hooked portions for engaging with the spare tire body made of serially connected combining blocks. When the tire gets punctured and damaged by a knife or a sharp article, the spare tire body allows the tire to keep work safely. Therein, the spare tire body is a C-shaped member composed of plural combining blocks, plural C-shaped holding pieces and a C-shaped lining piece. It can be engaged with the hooked portions of the tire rapidly and arm the tire with puncture-proof ability.

The objective of the present invention is to provide such a puncture-proof structure, wherein the preassembled spare tire body is a C-shaped part that can be directly engaged with the hooked portions of the tire, and a locking block has a depressed portion that allows a jig to access the interior thereof for convenient screwing operation, thereby achieving rapid installation. Besides, a tire using the spare tire body is puncture-proof such that when punctured by sharp articles or knifes, the tire can still work to make safe arrival at a nearby repair workshop. This saves a car driver who has a flat tire from shoving the car along a high-traffic road and risking his/her life, thereby ensuring the public traffic safety.

BRIEF DESCRIPTION OF THE SEVERAL VIEWS OF THE DRAWINGS

FIG. 6 is a perspective view of a locking block of the puncture-proof structure;

FIG. 7 is a perspective view of a locking block of the puncture-proof structure according to another aspect of the present invention;

FIG. 8 is a schematic drawing showing the combination of a patch member and sleeves of the puncture-proof structure;

DETAILED DESCRIPTION OF THE INVENTION

Figure 1:
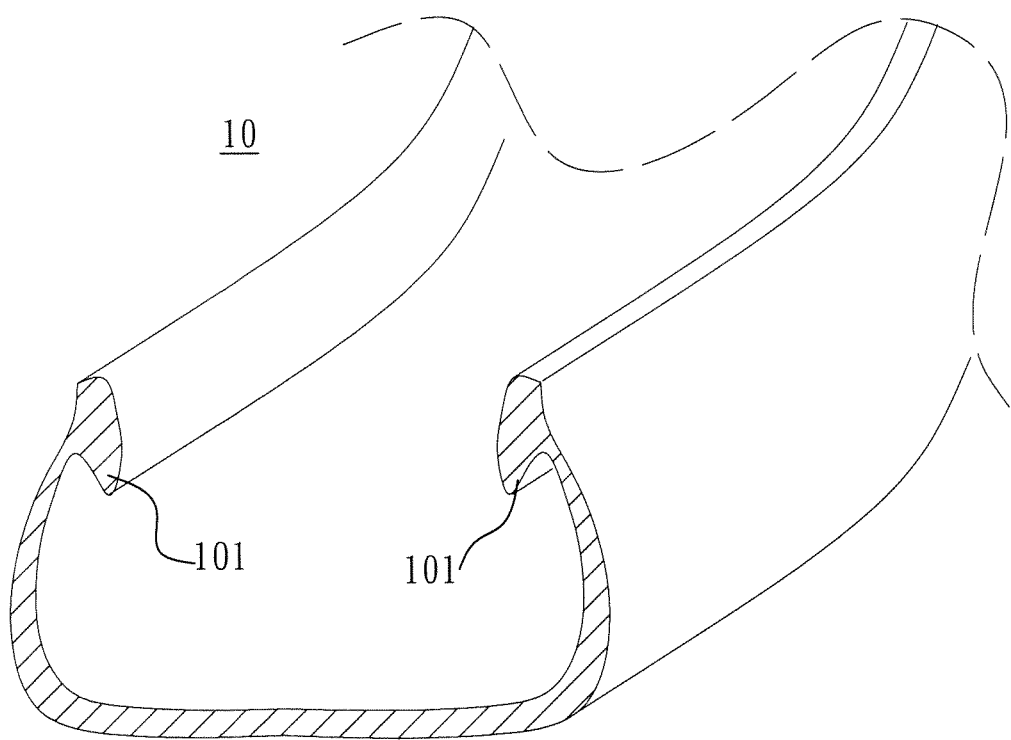
FIG. 1 is a cutaway view of a tire for working with the puncture-proof structure for tires of the present invention.

The present invention provides an improved puncture-proof structure for tires. Referring to FIG. 1, a tire 10 has its two top inner edges formed with hooked portions 101 and is reinforced by cords arranged therein.

Figure 2:
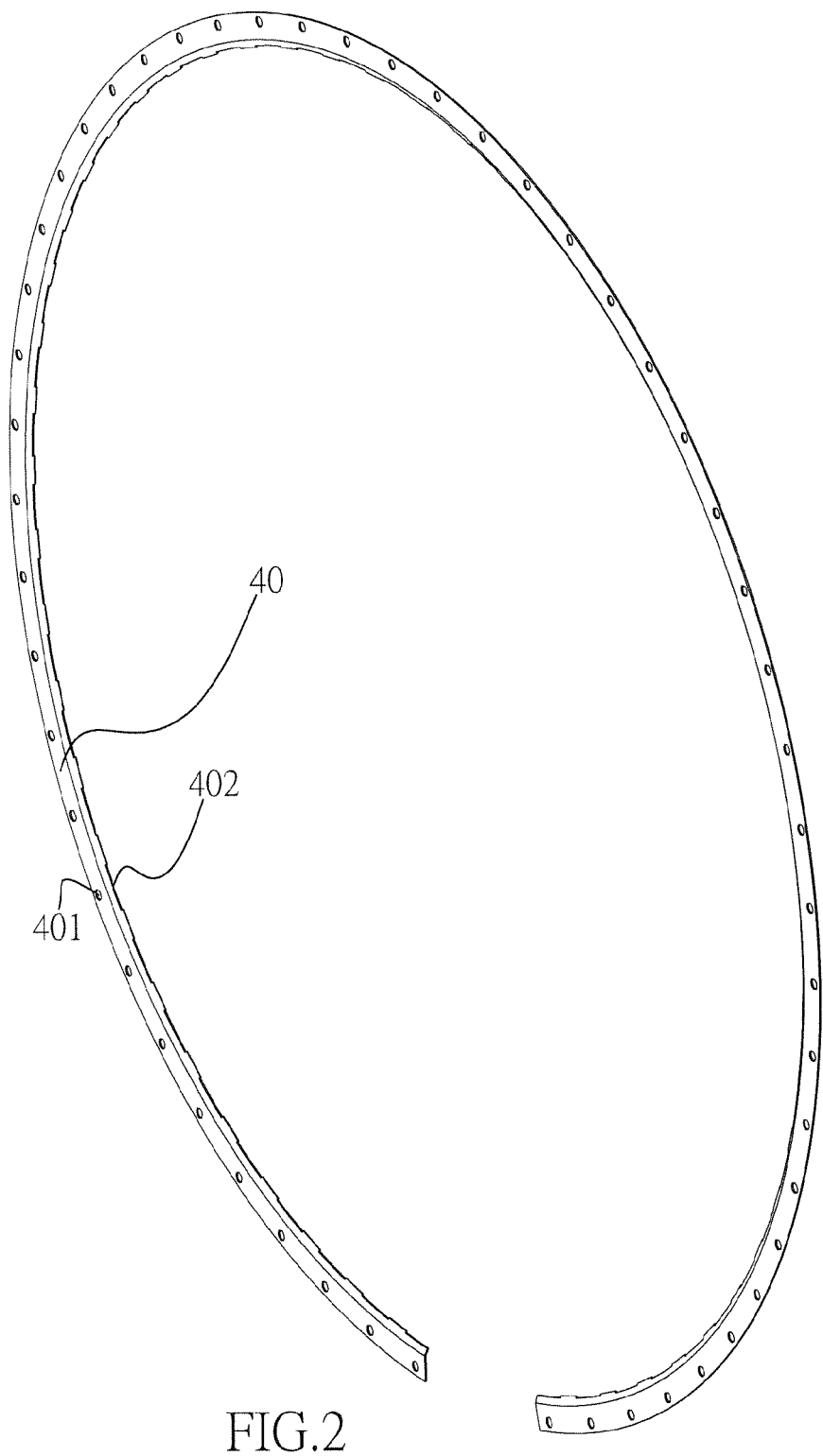
FIG. 2 is a perspective view of a C-shaped holding piece of the puncture-proof structure.

Referring to FIG. 2, two C-shaped holding pieces 40 each have a C-shaped body formed with plural through holes 401 and notches 402.

Figure 3:
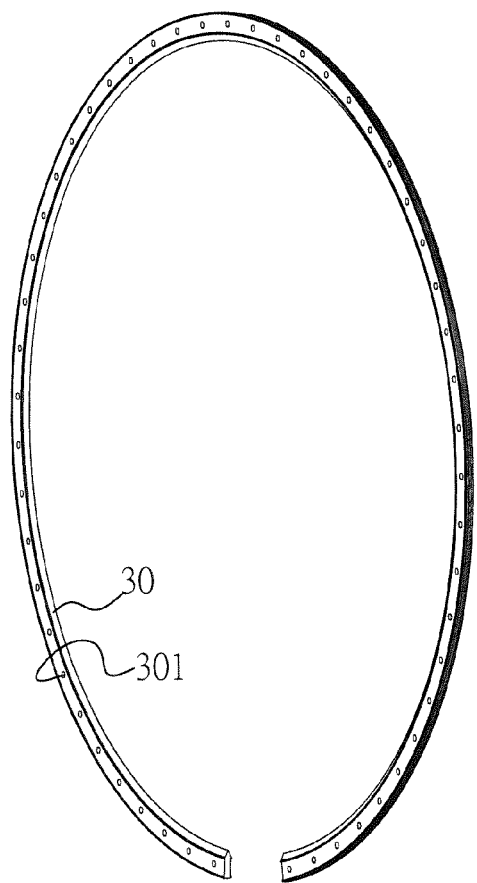
FIG. 3 is a perspective view of a C-shaped lining piece of the puncture-proof structure.

Referring to FIG. 3, a C-shaped lining piece 30 has a C-shaped body formed with plural through holes 301.

Figure 11:
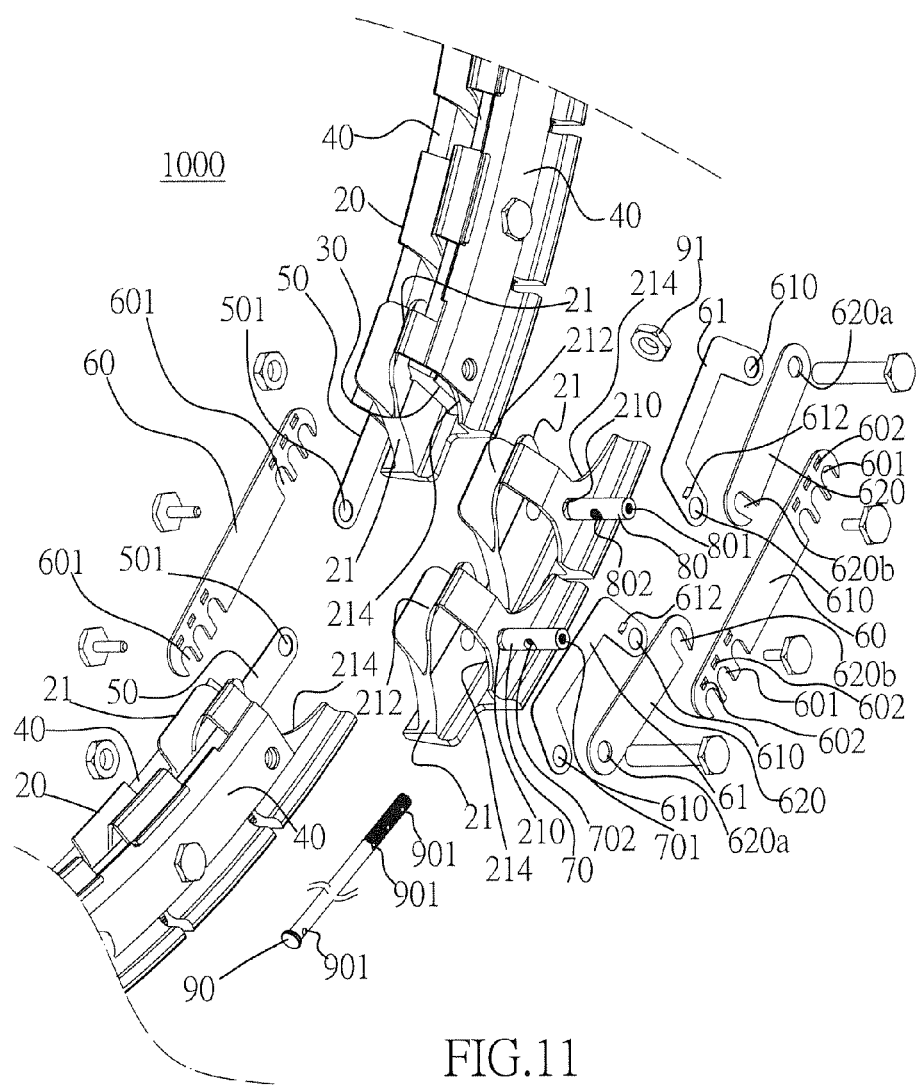
FIG. 11 shows components at two joined ends of the spare tire body formed by the puncture-proof structure for tire.
Figure 12:
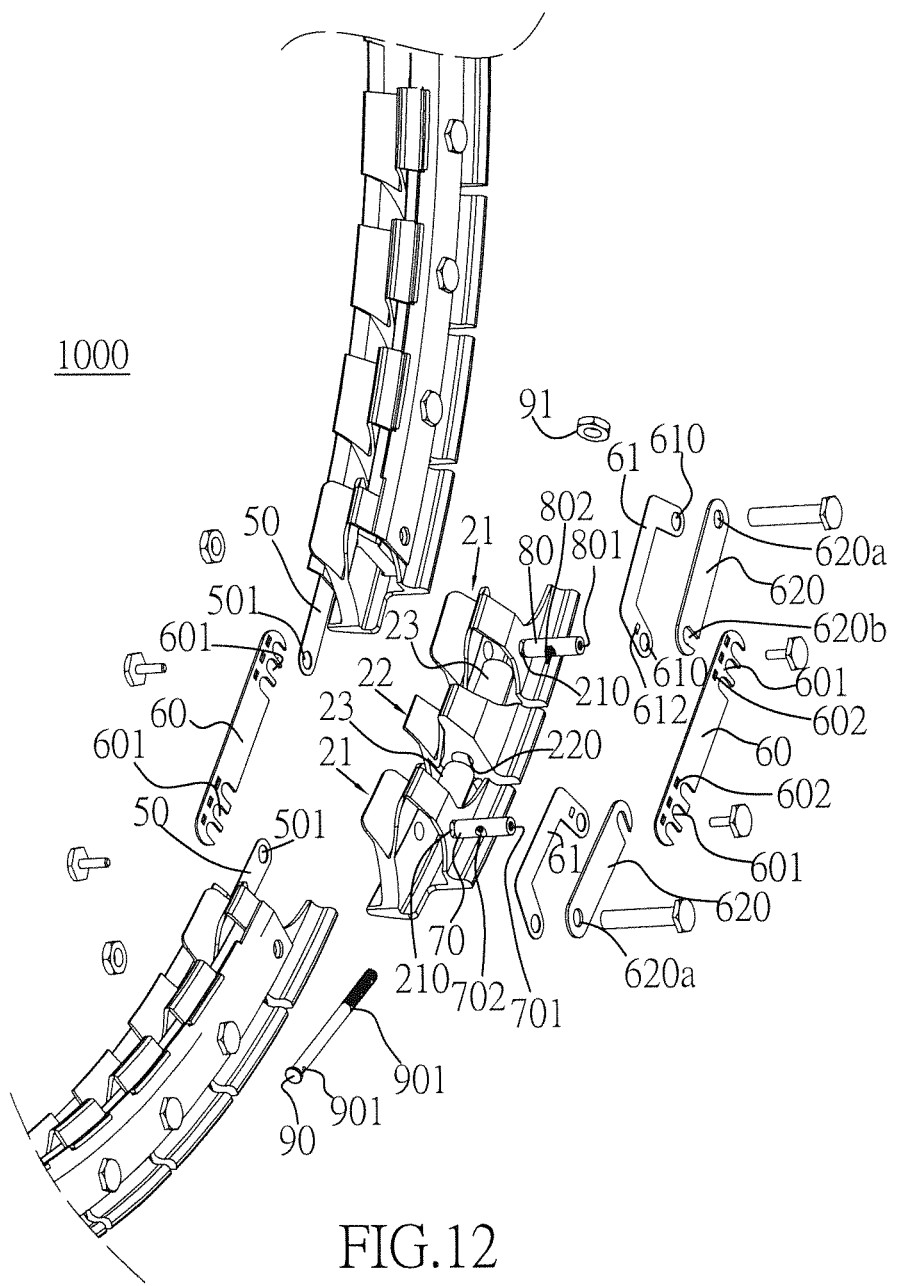
FIG. 12 shows components at two joined ends of the spare tire body formed by the puncture-proof structure for tire according to another aspect of the present invention.

Referring to FIG. 11, a plurality of connecting members 50 are provided, each of which has plural pivot holes 501.

Also referring to FIG. 11, an adjusting member 60 is a lengthwise piece with each of its two ends formed with notches 601 and above each of the notches 601 there is an engaging hole 602 provided.

A bridging member 61, as shown in FIG. 11, is provided as a piece with its two ends each formed with a pivot hole 610. Above one of the pivot holes 610, a bulge 612 is formed.

A plurality of hasps 620, as shown in FIG. 11, are provided, each of which is a piece with its two ends formed with a pivot hole 620a and an indentation 620b, respectively.

Still referring to FIG. 11, a pressing shaft 70 is an axle that passes through a through hole 210 provided on a locking block 21. The pressing shaft 70 has its two ends formed with threaded holes 701, and has a through hole 702 running radially therethrough.

A pressing bolt 80, as shown in FIG. 11, is an axle that passes through a through hole 210 provided on the locking block 21. The pressing bolt 80 has its two ends formed with threaded holes 801, and has a threaded retaining hole 802 running radially therethrough.

A pressing screw bolt 90, as shown in FIG. 11, is provided with plural positioning holes 901.

As shown in FIG. 11, a check nut 91 is also included.

Figures 4, 5:
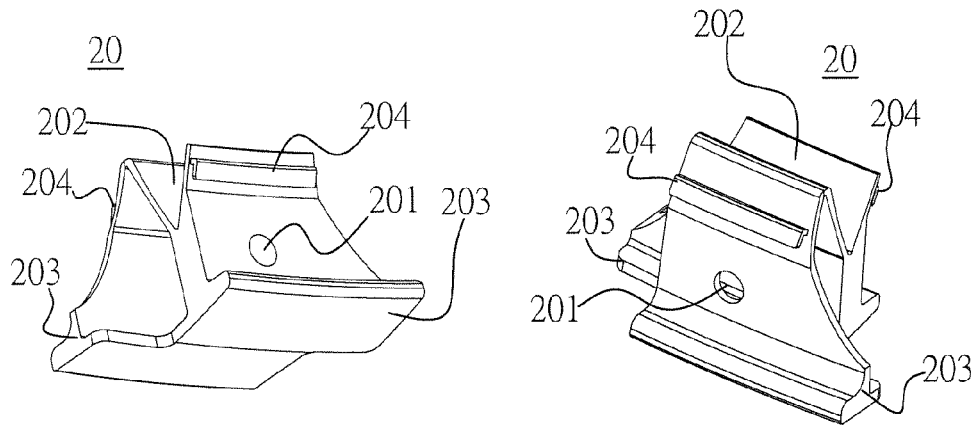
FIG. 4 is a perspective view of a combining block of the puncture-proof structure.
FIG. 5 is another perspective view of the combining block of the puncture-proof structure.

A combining block 20, as shown in FIG. 4 and FIG. 5, is a hollow member with two lateral sides thereof provided with through holes 201 and with its top formed as an engaging valley 202. The combining block 20 has its two lengthwise ends diagonally formed with projecting portions 203. An engaging rib 204 is formed above each of the through holes 201 at the two sides of the combining block 20.

The locking block 21, as shown in FIG. 6 and FIG. 7, has a hollow body with through holes 210 formed at two sides thereof and with its top formed as an engaging valley 212. The locking block 21 has its two lengthwise ends diagonally formed with projecting portions 213. A depressed portion 214 is formed on one side of the locking block 21.

A plurality of patch members 22, as shown in FIG. 8, are provided, each of which has a solid body formed with an axial through hole 220 and atop an engaging valley 222. The patch member 22 has its two lengthwise ends diagonally formed with projecting portions 223. Two sleeves 23 are also provided.

Figure 9:
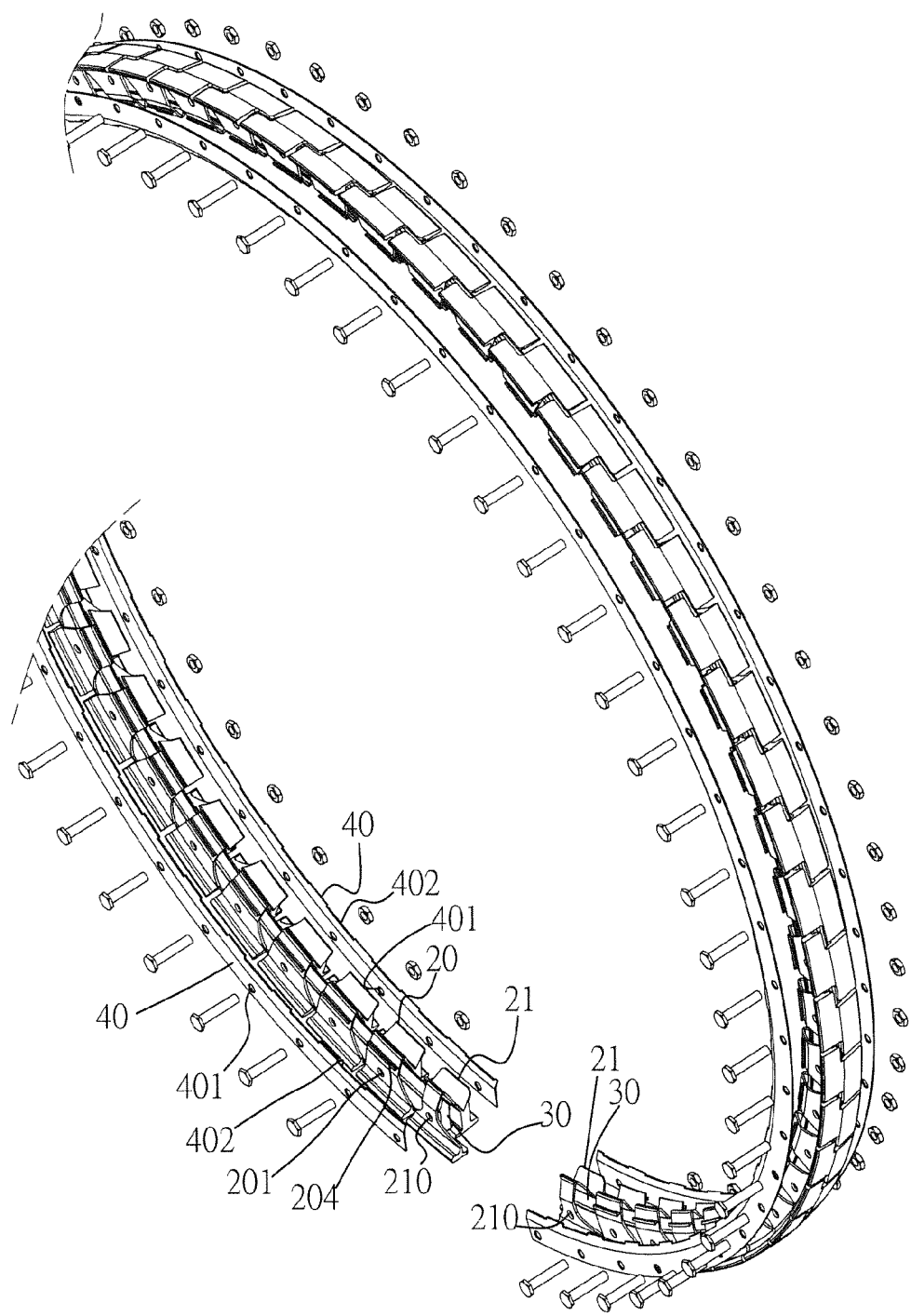
FIG. 9 is a partially exploded view of a spare tire body formed by the puncture-proof structure for tire.
Figure 10:
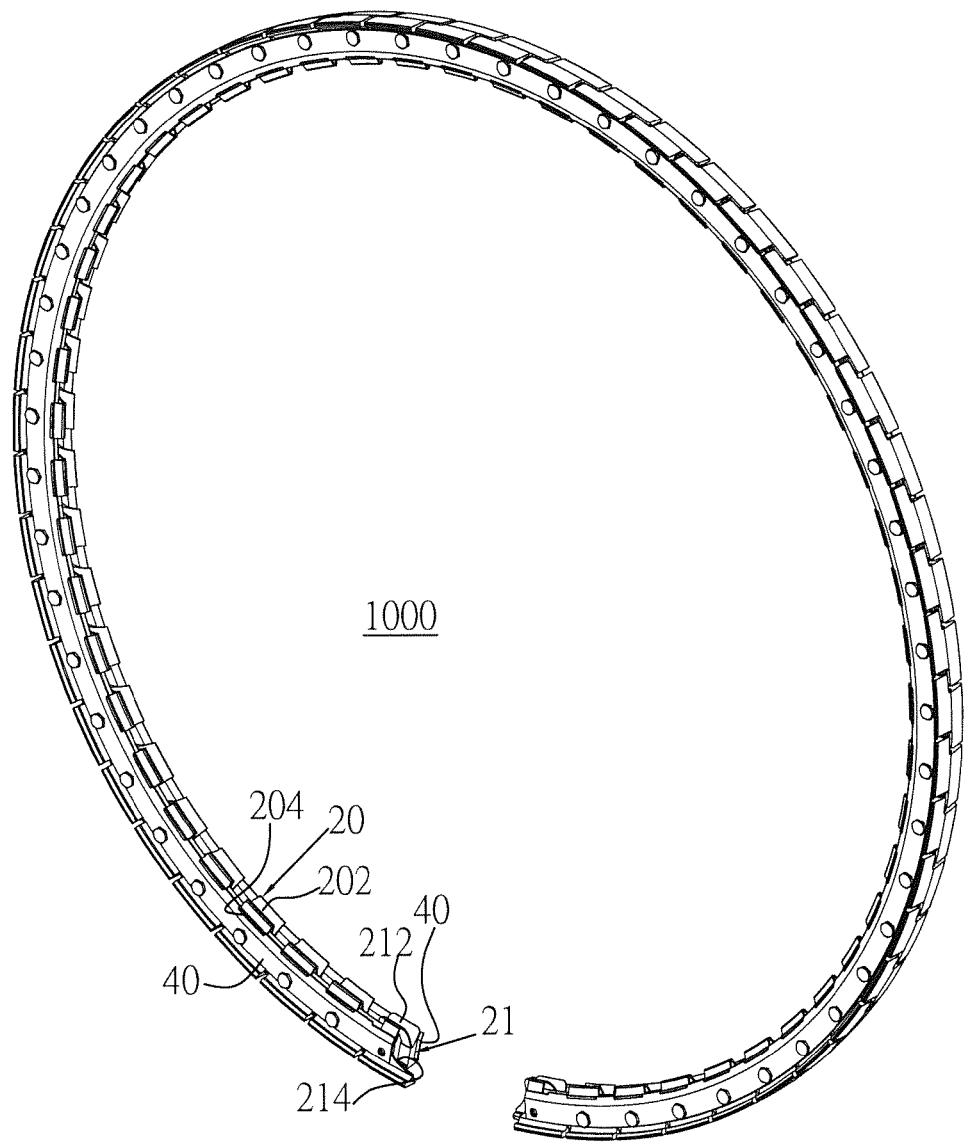
FIG. 10 is a perspective view of the spare tire body formed by the puncture-proof structure for tire.

Referring to FIG. 9 and FIG. 10, the C-shaped lining piece 30 is configured to be inserted into the hollow combining blocks 20 so that the through holes 301 of the C-shaped lining piece 30 are aligned with the through holes 201 on the combining blocks 20. The two C-shaped holding pieces 40 are such placed that the through holes 401 thereof are aligned with the through holes 201 on the combining blocks 20, so that screw bolts passing through the through holes 301, 401, 201 of the C-shaped lining piece 30, the C-shaped holding pieces 40 and the combining blocks 20 can hold the components together to form a C-shaped spare tire body 1000. At this time, the two engaging ribs 204 provided at the two sides of the combining block 20 are engaged with notches 402 formed on the C-shaped holding pieces 40. Furthermore, the spare tire body 1000 has its front and rear ends jointed by the locking block 21 as a circle. The hollowness of the locking block 21 allows the C-shaped lining piece 30 to pass therethrough. Also, the through holes 210 of the locking block 21 are aligned with the through holes 301 and 401 of the C-shaped lining piece 30 and the C-shaped holding pieces 40.

Figure 13:
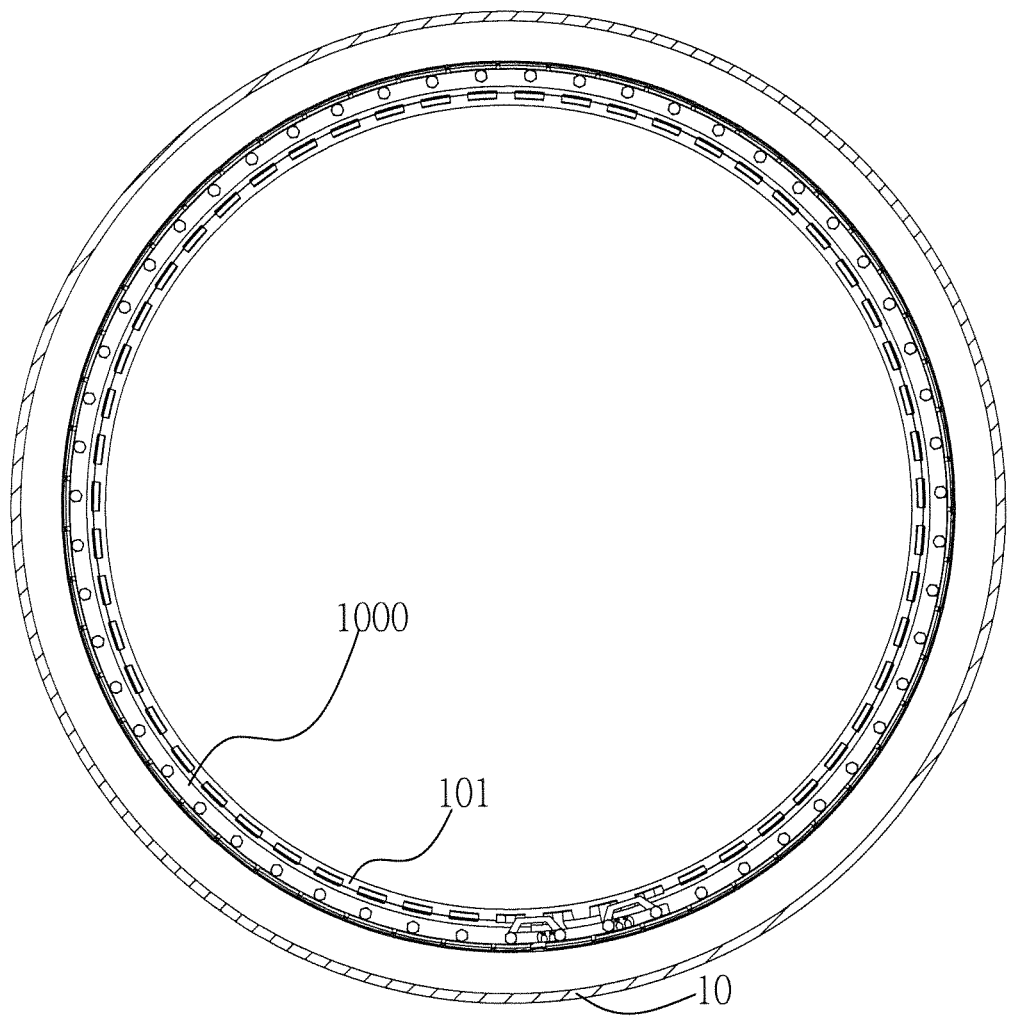
FIG. 13 is a cross-sectional view of a tire having the spare tire body formed by the puncture-proof structure engaged with hooked portions of the tire.
Figure 14:
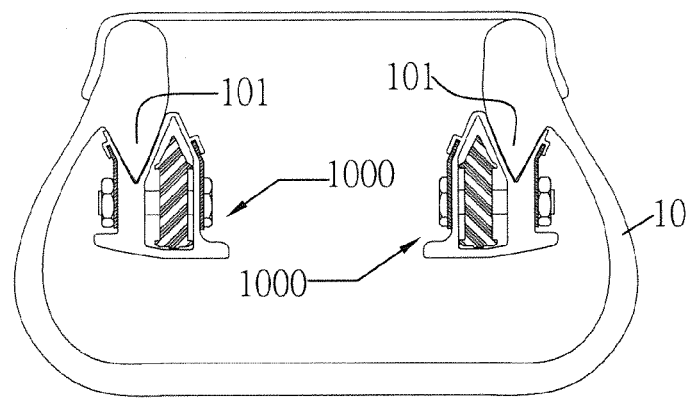
FIG. 14 is another cross-sectional view of the tire having the spare tire body formed by the puncture-proof structure engaged with the hooked portions of the tire.

As shown in FIGS. 11, 13 and 14, the combination between the spare tire body 1000 and the tire 10 is, for example, achieved by engaging the engaging valleys 202, 212 of the combining blocks 20 and the locking block 21 with the hooked portions 101 of the tire 10, and having the through holes 210, 401, 301 of the locking block 21 that shapes the spare tire body 1000 and of the C-shaped holding pieces 40 and of the C-shaped lining piece 30 aligned with the pivot holes 501, 610, 620a of the connecting member 50, of the bridging member 61, and of the hasp 620 so as to allow screws to pass all the holes and hold all the components together. The connecting member 50 and the bridging member 61 connecting two ends of the spare tire body 1000 have their pivot holes 501, 610 each aligned with a threaded hole 701 of the pressing shaft 70 fixedly held by the through hole 210 of one of the locking block 21 or the threaded hole 801 of the pressing bolt 80 fixedly held by the through hole 210 of the other of the locking block 21. The through hole 702 of the pressing shaft 70 receives a pressing screw bolt 90, and the threaded retaining hole 802 of the pressing bolt 80 is configured to screwedly receive the pressing screw bolt 90 passing through the through hole 702 of the pressing shaft 70. By screwing the pressing screw bolt 90 in or out with respect to the threaded retaining hole 802, the spare tire body 1000 can be finely tuned to fittingly engaged with the hooked portions 101 of the tire 10. The check nut 91 is screwed into the end of the pressing screw bolt 90 to prevent looseness and ensure firm combination. Therein, the depressed portions 214 of the locking block 21 leave space that allows a jig to access and screw the pressing screw bolt 90 and the check nut 91. Also provided is an adjusting member 60 straddling the two connecting members 50. Then a bolt passing the notch 601 of the adjusting member 60, the pivot hole 501 of the connecting member 50 and the threaded holes 701, 801 of the pressing shaft 70 and the pressing bolt 80 can hold the components together. Additionally, another adjusting member 60 straddles two hasps 620 and a threaded bolt passing the notch 601 of the adjusting member 60, the indentation 620b of the hasp 620, the pivot hole 610 of the bridging member 61 and the threaded holes 701, 801 of the pressing shaft 70 and the pressing bolt 80 can hold the components together and be retained in the positioning hole 901 of the pressing screw bolt 90. The spare tire body 1000 thus gets combined with the hooked portions 101 of the tire 10. When damaged by a sharp article, the tire 10 can still drive the car to a repair work shop by using the spare tire body 1000.

Therein, the bulge 612 on the bridging member 61 is for abutting against the upper edge of the hasp 620 so as to retain the hasp 620 from escaping. The bulge 612 is configured to be fittingly inserted into the engaging hole 602 of the adjusting member 60 for enhanced firmness.

Moreover, for special tires that have relatively large dimensions, with the combination of the patch member 22 and the sleeves 23 sandwiching it axially, which is arranged between the locking blocks 21 that are assembled with the pressing shaft(s) 70 or the pressing screw bolt(s) 90. Particularly, the pressing screw bolt 90 first passes the through hole 702 of the pressing shaft 70, then one said sleeve 23, then the through hole 220 of the patch member 22, and then the other said sleeve 23, before being screwed into the threaded retaining hole 802 of the pressing bolt 80 fixed to the through hole 210 of the other locking block 21. Afterward, a check nut 91 is screwed onto the end of the pressing screw bolt 90 for preventing looseness. As a next step, one adjusting member 60 is mounted over two connecting members 50, with a bolt passing through the notch 601 of the adjusting member 60, the pivot hole 501 of the connecting member 50 and the threaded holes 701, 801 of the pressing shaft 70 and the pressing bolt 80. Following, another adjusting member 60 is mounted over two hasps 620, with a bolt passing through the notch 601 of the adjusting member 60, indentation 620b of the hasp 620, the pivot hole 610 of the bridging member 61, and the threaded holes 701, 801 of the pressing shaft 70 and the pressing bolt 80 and getting retained, so that the spare tire body 1000 can be firmly combined with the hooked portions 101 of the tire 10.

Figure 16:
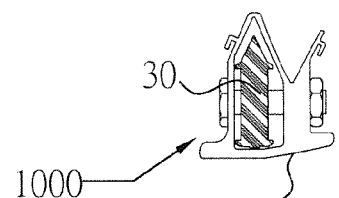
FIG. 16 is a cross-sectional view of a simplified spare tire body formed according to still another embodiment of the puncture-proof structure of the present invention.
Figure 15:
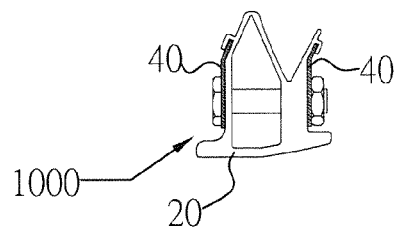
FIG. 15 is a cross-sectional view of a simplified spare tire body formed according to another embodiment of the puncture-proof structure of the present invention.
Figure 18:
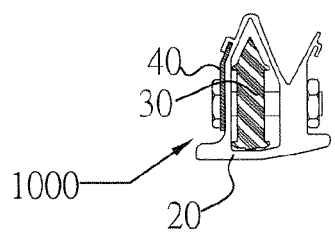
FIG. 18 is a cross-sectional view of a simplified spare tire body formed according to yet another embodiment of the puncture-proof structure of the present invention.
Figure 17:
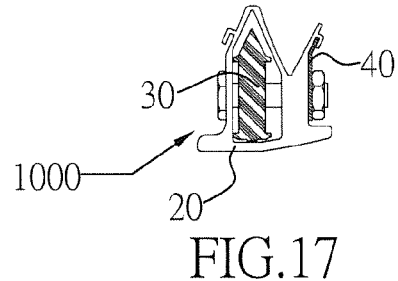
FIG. 17 is a cross-sectional view of a simplified spare tire body formed according to still another embodiment of the puncture-proof structure of the present invention.

As described above, the spare tire body 1000 is composed of plural combining blocks 20, the locking blocks 21, the C-shaped lining piece 30 and two C-shaped holding pieces 40 held together by screw bolts. However, for its use in tires with different load levels, the spare tire body 1000, as shown in FIG. 16, may be simplified into a combination of plural combining blocks 20 and one C-shaped lining piece 30 that are held together by screw bolts. Alternatively, the spare tire body 1000, as shown in FIG. 17 and FIG. 18, may be simplified into a combination of plural combining blocks 20, one C-shaped holding piece 40, and one C-shaped lining piece 30 held together by screw bolts. In another embodiment, as shown in FIG. 15, the spare tire body 1000 is formed by plural combining blocks 20 and two C-shaped holding pieces 40 held together by screw bolts.

To sum up, the present invention is effective in preventing puncture and ensuring driving safety with simple yet accomplished configuration that requires significantly reduced manufacturing costs and time. As this novel configuration has not been seen in public to date, a patent application is herein filed for the same.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A puncture-proof structure for tires, the puncture-proof structure comprising:
   a tire, having two top inner edges thereof formed with hooked portions and being reinforced by cords arranged therein;
   two C-shaped holding pieces, each having a C-shaped body formed with plural through holes and notches;
   a C-shaped lining piece, having a C-shaped body formed with a plurality of through holes;
   a plurality of connecting members, each having plural pivot holes at two ends thereof;
   an adjusting member, having two ends thereof each formed with plural notches, wherein above each of the notches there is an engaging hole provided;
   a bridging member, having two ends thereof each formed with a pivot hole, wherein above each of the pivot holes there is a bulge;
   a plurality of hasps, each having two ends thereof formed with a pivot hole and an indentation, respectively;
   a pressing shaft, having two ends thereof formed with threaded holes, and including a through hole running radially therethrough, the pressing shaft being configured to fit in a through hole of a first locking block;
   a pressing bolt, having two ends thereof formed with threaded holes and including a threaded retaining hole running radially therethrough, the pressing bolt being configured to fit in a through hole of a second locking block;
   a pressing screw bolt, having plural positioning holes;
   a check nut;
   a combining block, having two lateral sides thereof provided with through holes and with a top thereof formed as an engaging valley, wherein the combining block has two lengthwise ends thereof diagonally formed with projecting portions and an engaging rib is formed above each of the through holes at the two sides of the combining block;
   the first locking block and the second locking block each having through holes formed at two sides thereof and having an engaging valley formed at a top thereof, wherein the locking block has two lengthwise ends thereof diagonally formed with projecting portions and a depressed portion is formed on one said side of the locking block; and
   a patch member, having an axial through hole and an engaging valley at a top thereof, wherein the patch member having two lengthwise ends thereof diagonally formed with projecting portions and is configured to work with two sleeves, the two sleeves axially sandwiching the patch member therebetween;
   the C-shaped lining piece being configured to be inserted into the combining block so that the through holes of the C-shaped lining piece are aligned with the through holes on the combining block, the two C-shaped holding pieces being such placed that the through holes thereof are aligned with the through holes on the combining blocks, so that screw bolts passing through the through holes of the C-shaped lining piece, the C-shaped holding pieces and the combining blocks hold the components together to form a C-shaped spare tire body, the two engaging ribs provided at the two sides of the combining block being engaged with notches formed on the C-shaped holding pieces, the spare tire body having front and rear ends thereof jointed by the locking blocks as a circle, the hollow locking block allowing the C-shaped lining piece to pass therethrough, the through holes of the locking block being aligned with the through holes of the C-shaped lining piece and the C-shaped holding pieces;
   the spare tire body and the tire being combined by engaging the engaging valleys of the combining blocks and the locking block with the hooked portions of the tire, and by having the through holes of the locking block that shapes the spare tire body and of the C-shaped holding pieces and of the C-shaped lining piece aligned with the pivot holes of the connecting member, of the bridging member, and of the hasp, so as to allow screws to pass all the holes and hold all the components together, the connecting member and the bridging member that connect two ends of the spare tire body having their pivot holes each aligned with one said threaded hole of the pressing shaft fixedly held by the through hole of one of the locking block or the threaded hole of the pressing bolt fixedly held by the through hole of the other of the locking block, the through hole of the pressing shaft receiving a pressing screw bolt, and the threaded retaining hole of the pressing bolt being configured to receive the pressing screw bolt that passes through the through hole of the pressing shaft; by screwing the pressing screw bolt in or out with respect to the threaded retaining hole, the spare tire body being finely tuned to fittingly engaged with the hooked portions of the tire; the check nut being screwed into the end of the pressing screw bolt to prevent looseness and ensure firm combination; therein, the depressed portions of the locking block leaving space that allows a jig to access and screw the pressing screw bolt and the check nut; one said adjusting member straddling the two connecting members, and a bolt passing the notch of the adjusting member, the pivot hole of the connecting member and the threaded holes of the pressing shaft and the pressing bolt holding the components together; additionally, another said adjusting member straddling two said hasps and a threaded bolt that passes a notch of the adjusting member, the indentation of the hasp, the pivot hole of the bridging member and the threaded holes of the pressing shaft and the pressing bolt holding the components together and being retained in the positioning hole of the pressing screw bolt; and the spare tire body thus being combined with the hooked portions of the tire; and the bulge on the bridging member abutting against an upper edge of the hasp so as to retain the hasp from escaping, and being configured to be fittingly inserted into the engaging hole of the adjusting member for enhanced firmness.

2. The puncture-proof structure of claim 1, wherein the patch member and the two sleeves are removably inserted between the first locking block and the second locking block to increase the puncture-proof structure in circumference, the puncture-proof structure thereby accommodating tires of varying circumferences.

3. The puncture-proof structure of claim 1, wherein the spare tire body is in a simplified form of a combination of a plurality of said combining blocks and one said C-shaped lining piece that are held together by said screw bolts.

4. The puncture-proof structure of claim 1, wherein the spare tire body is in a simplified form of a combination of a plurality of said combining blocks, one said C-shaped holding piece, and one said C-shaped lining piece that are held together by said screw bolts.

5. The puncture-proof structure of claim 1, wherein the spare tire body is in a simplified form of a combination of a plurality of said combining blocks and two said C-shaped holding piece that are held together by said screw bolts.

\* \* \* \* \*